US007015284B2

(12) United States Patent
Ajbani et al.

(10) Patent No.: US 7,015,284 B2
(45) Date of Patent: Mar. 21, 2006

(54) THERMOPLASTIC ELASTOMER COMPOSITION

(75) Inventors: Manoj Ajbani, Copley, OH (US); Christopher Kiehl, Akron, OH (US); Lawson Gibson Wideman, Hudson, OH (US); Rajesh Varma, McHenry, IL (US)

(73) Assignees: The Goodyear Tire & Rubber Company, Akron, OH (US); GLS Corporation, McHenry, IL (US)

( * ) Notice: Subject to any disclaimer, the term of this patent is extended or adjusted under 35 U.S.C. 154(b) by 0 days.

(21) Appl. No.: 10/786,975

(22) Filed: Feb. 25, 2004

(65) Prior Publication Data

US 2005/0148727 A1    Jul. 7, 2005

Related U.S. Application Data

(60) Provisional application No. 60/534,455, filed on Jan. 6, 2004.

(51) Int. Cl.
C08L 53/02    (2006.01)

(52) U.S. Cl. .................... 525/88; 525/92 B; 525/92 R; 525/92 C; 525/98; 525/99

(58) Field of Classification Search ................ 525/88, 525/92 B, 98, 99, 92 R, 92 C
See application file for complete search history.

(56) References Cited

U.S. PATENT DOCUMENTS

| | | | |
|---|---|---|---|
| 3,686,364 A | 8/1972 | Robinson et al. ............ 260/876 |
| 3,758,643 A | 9/1973 | Fisher ......................... 260/897 |
| 3,865,776 A | 2/1975 | Gergen ....................... 260/33.6 |
| 4,104,210 A | 8/1978 | Coran et al. ................. 525/232 |
| 4,130,535 A | 12/1978 | Coran et al. ................. 524/487 |
| 4,183,876 A | 1/1980 | Coran et al. ................. 525/232 |
| 4,202,801 A | 5/1980 | Petersen ...................... 525/232 |
| 4,203,884 A | 5/1980 | Coran et al. ................. 524/518 |
| 4,250,273 A | 2/1981 | Bohm et al. ................... 525/99 |
| 4,271,049 A | 6/1981 | Coran ........................ 525/191 |
| 4,311,628 A | 1/1982 | Abdou-Sabet et al. ....... 525/232 |
| 4,340,684 A | 7/1982 | Bohm et al. ................. 525/194 |
| 4,343,918 A | 8/1982 | Bohm et al. ................. 525/194 |
| 4,444,236 A | 4/1984 | Kan et al. ................. 152/209.5 |
| 4,553,578 A | 11/1985 | Vitus et al. ............... 152/209.1 |
| 4,594,390 A | 6/1986 | Abdou-Sabet et al. ....... 525/232 |
| 4,803,244 A | 2/1989 | Umpleby ..................... 525/105 |
| 4,914,160 A * | 4/1990 | Azizian .................... 525/329.3 |
| 4,927,882 A | 5/1990 | Bayan ........................... 525/99 |
| 5,021,500 A | 6/1991 | Puydak et al. .............. 524/525 |
| 5,051,478 A | 9/1991 | Puydak et al. .............. 525/195 |
| 5,064,910 A | 11/1991 | Hattori et al. ............ 525/359.1 |
| 5,248,729 A | 9/1993 | Inoue et al. ............... 525/92 B |
| 5,362,794 A | 11/1994 | Inui et al. ................... 524/496 |
| 5,523,356 A | 6/1996 | Aldrovandi et al. ......... 525/237 |
| 5,621,045 A | 4/1997 | Patel et al. ................. 525/237 |
| 5,672,660 A | 9/1997 | Medsker et al. ............ 525/101 |
| 5,677,399 A | 10/1997 | Hall ............................ 526/83 |
| 5,786,441 A | 7/1998 | Lawson ..................... 528/229 |
| 5,936,028 A | 8/1999 | Medsker et al. ............ 524/506 |
| 6,008,295 A | 12/1999 | Takeichi et al. ............ 525/105 |
| 6,051,681 A | 4/2000 | Dozeman et al. ........... 528/485 |
| 6,069,202 A | 5/2000 | Venkataswamy et al. ..... 525/66 |
| 6,084,031 A | 7/2000 | Medsker et al. ............ 525/192 |
| 6,090,880 A | 7/2000 | Zimmer et al. ............. 524/492 |
| 6,147,160 A | 11/2000 | Wang et al. ................ 525/106 |
| 6,150,464 A | 11/2000 | Medsker et al. ............ 525/101 |
| 6,169,145 B1 | 1/2001 | Medsker et al. |
| 6,207,761 B1 | 3/2001 | Smith et al. ................ 525/221 |
| 6,228,908 B1 | 5/2001 | Takeichi et al. .............. 524/27 |
| 6,251,998 B1 | 6/2001 | Medsker et al. ............ 525/192 |
| 6,252,007 B1 | 6/2001 | Oziomek et al. ......... 525/332.6 |
| 6,437,030 B1 | 8/2002 | Coran et al. ................ 524/101 |
| 6,723,776 B1 * | 4/2004 | Sakaki et al. ............... 524/474 |
| 2002/0077409 A1 * | 6/2002 | Sakaki et al. ............... 524/496 |

* cited by examiner

*Primary Examiner*—Jeffrey Mullis
(74) *Attorney, Agent, or Firm*—Alvin T. Rockhill

(57) ABSTRACT

The present invention relates to a soft thermoplastic elastomer composition that is free of thermoplastic resin that can be utilized in manufacturing shoe sole inserts, seals, gaskets, wheels, and that can be overmolded on a hard substrate, such as a metal or a thermoplastic resin, for grips or handles on various household items. The present invention more specifically discloses a thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

45 Claims, No Drawings

THERMOPLASTIC ELASTOMER COMPOSITION

This application claims the benefit of U.S. Provisional Patent Application Ser. No. 60/534,455, filed on Jan. 6, 2004.

FIELD OF THE INVENTION

The present invention relates to a soft themoplastic elastomer composition that is free of thermoplastic resin that can be utilized in manufacturing shoe sole inserts, seals, gaskets, wheels, and that can be overmolded on a hard substrate, such as a metal or a thermoplastic resin, for grips or handles on various household items.

BACKGROUND OF THE INVENTION

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged.

Because the handles of these household items are normally made of a hard plastic, the simplest tasks can become problematic. As in the case of a toothbrush or shaving razor, the handle generally comes into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible.

Most people would prefer to grip objects with a softer handle that is more soothing to the touch and easier to grip. Accordingly, a need exists for a soft grip handle that can be grasped firmly and comfortably, which requires minimum strength and dexterity to grip and maneuver, and that has a good balance of compression set and oil resistance properties.

U.S. Pat. No. 3,758,643 discloses blends of partially cured monoolefin rubber such as ethylene-propylene-diene rubber (EPDM) with a polyolefin resin where the rubber phase was cured with a peroxide curing agent. The compositions were useful as thermoplastic elastomers and contained a thermoplastic resin.

U.S. Pat. No. 4,104,210 discloses compositions of blends of vulcanized high diene rubbers with crystalline thermoplastic polyolefin resins. The diene rubbers include copolymers of diene with styrene, vinyl pyridine, acrylonitrile or methacrylonitrile. The compositions were of higher hardness and contained a thermoplastic polyolefin resin.

U.S. Pat. No. 4,130,535 discloses blends of polyolefin resins and completely cured monoolefin copolymer rubber such as EPDM.

U.S. Pat. No. 4,183,876 discloses thermoplastic compositions of crystalline thermoplastic polyolefin resins and cross-linked polyalkenamer rubber.

U.S. Pat. No. 4,202,801 discloses dynamically and partially cured blends of monoolefin copolymer rubbers such as ethylene-propylene copolymer rubbers or ethylene-propylene-diene terpolymer rubbers, polyolefin resin, and conjugated diene rubbers such as cis-1,4 polyisoprene or cis-polybutadiene or polychloroprene.

U.S. Pat. No. 4,203,884 discloses blends of polynorborene, plasticizer, and thermoplastic polyolefin resin.

U.S. Pat. No. 4,311,628 relates to blends of polypropylene and EPDM where EPDM was cured with phenolic resins for better oil resistance.

U.S. Pat. No. 4,271,049 discloses blends of crystalline polypropylene and cured rubbers including styrene-butadiene rubber up to 25 weight % styrene or alpha-methyl styrene and the rubber is cured with phenolic or urethane or sulfur donor curative. The preferred compositions were from 25–75 parts of polypropylene and about 75–25 parts of rubber.

U.S. Pat. No. 4,183,876 teaches blends of crosslinked polyalkenamer rubber and crystalline thermoplastic blends.

U.S. Pat. No. 4,340,684 is similar to U.S. Pat. No. 4,250,273 and further teaches partial curing of the rubber and narrows the claims for the melt flow rate of the formed blend. A thermoplastic resin was required for the preparation of the compositions.

U.S. Pat. No. 4,343,918 claims processes for making blends primarily disclosed in U.S. Pat. No. 4,250,273.

U.S. Pat. No. 4,594,390 discloses a process for preparation of thermoplastic elastomers of polypropylene and EPDM under conditions of high shear required for dynamic vulcanization of the EPDM. Here again, a polypropylene resin was required for the dynamic vulcanization of the crosslinkable elastomer.

U.S. Pat. No. 5,021,500 teaches TPO compositions prepared with a crystalline thermoplastic resin and a halobutyl rubber.

U.S. Pat. No. 5,051,478 provides a dynamically vulcanized composition comprising of a polyolefin resin, an elastomer, and an ethylene copolymer resin such as a copolymer of ethylene and vinyl acetate or an alkyl acrylate.

U.S. Pat. No. 5,248,729 suggests the process for making thermoplastic composition by heat treating a mixture of a thermoplastic resin with no olefinic unsaturated carbon-carbon bond, an elastomer from the group of SBS, SIS, 1,2-polybutadiene rubber, and EPDM rubber, with a crosslinking agent of dihydroaromatic compound.

U.S. Pat. No. 5,523,356 teaches blends obtained by dynamic vulcanization of polypropylene, polyisobutene, EPDM rubber, and polybutadiene.

U.S. Pat. No. 5,621,045 discloses thermoplastic vulcanizates from semi-crystalline polyolefins and blends of crosslinked rubbers with one rubber being C4 to C7 isomonoolefin based (isobutylene) and rubber being EPDM or rubbers derived from a conjugated diene.

U.S. Pat. No. 6,051,681 discloses process for preparation of thermoplastic elastomer with a rubber such as ethylene-alpha-olefin diene terpolymer (EPDM) and a thermoplastic resin, phenolic curative, a hydrotalcite and a HALS compound.

U.S. Pat. No. 6,207,761 discloses thermoplastic ionomer blend or alloy composition containing an ionomer, crosslinked rubber and polyolefin resins.

U.S. Pat. No. 4,250,273 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,340,684 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer, where in the blend was partially cured so that a thermoplastic elastomer was formed which had a melt flow index of at least 1.0 when tested in accordance with ASTM D 1238 condition L at a load of 100 pounds. The authors suggest that when the melt flow rate of the formed blend was less than 1.0, thermosetting formulations were formed.

U.S. Pat. No. 4,343,918 claims the process for making a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,803,244 teaches the process for preparation of a thermoplastic elastomer comprising mixing an elastomer containing carbon-carbon double blond, a saturated thermoplastic resin such as polyethylene, polypropylene, polystyrene, nylon 6, nylon 66, nylon 11, and nylon 12, and dynamically crosslinking the elastomer with a hydrosilation crosslinking system. The obtained thermoplastic compositions were of high hardness and the thermoplastic resin was essential for the preparation of the composition.

U.S. Pat. No. 4,927,882 claims a thermoplastic elastomer composition having a compression set less than about 30% and produced by dynamic vulcanization of SBR to form a dispersed phase of crosslinked SBR in a co-continuous matrix of SEBS and polypropylene. The compositions had specific use in the pharmaceutical applications.

U.S. Pat. No. 5,672,660 teaches an improvement in the process for the preparation of a thermoplastic elastomer composition comprising a blend of a thermoplastic olefin resin and an unsaturated rubber, wherein the crosslinking of the rubber was carried-out with hydrosilation crosslinking system and at low concentrations of the catalyst. The obtained thermoplastic elastomer compositions were of higher hardness and the thermoplastic olefinic resin was essential for the preparation of the composition.

U.S. Pat. No. 5,936,028 teaches an improvement in the process for hydrosilation crosslinking of a diene-containing elastomer in presence of a olefinic thermoplastic resin, wherein the oil was substantially free of sulfur. The obtained thermoplastic compositions were of high hardness and required the presence of a thermoplastic olefinic resin.

U.S. Pat. No. 6,069,202 teaches a thermoplastic elastomer composition that is prepared by blending a polar thermoplastic and non-elastomeric resin, olefinic rubber, and halogenated rubbery copolymer, wherein the rubbers are dynamically vulcanized. The thermoplastic compositions were of high hardness and the preparation required the presence of a polar and non elastomeric thermoplastic resin selected from polyamide, polycarbonate, polyester, polysulfone, polylactone, polyacetals, acrylonitrile-butadiene-styrene-resin, polyphenylene oxide, polyphenylene sulfide, styrene acrylonitrile and the like.

U.S. Pat. No. 6,084,031 teaches a thermoplastic elastomer composition prepared with a thermoplastic resin and a butyl rubber. The thermoplastic olefinic and crystalline resins were essential for the preparation of the compositions and as a consequence, compounds of high hardness were obtained.

U.S. Pat. No. 6,150,464 also teaches a thermoplastic vulcanizate that is prepared with a thermoplastic resin and a crosslinked rubber. The compositions require the crosslinking be carried-out in the presence of the crystalline resins, and again compositions of high hardness were obtained.

U.S. Pat. No. 6,147,160 teaches the preparation of a thermoplastic elastomer prepared with a thermoplastic resin and a butyl rubber. The compositions of high hardness were prepared.

U.S. Pat. No. 6,169,145 teaches a thermoplastic elastomer comprising a blend of a thermoplastic polyolefin resin and a rubber containing carbonyl functional groups. The compositions of high hardness were prepared.

U.S. Pat. No. 6,251,998 teaches a thermoplastic elastomer composition that is prepared with a thermoplastic resin and a ethylene-propylene-diene rubber with vinyl norbornene.

U.S. Pat. No. 6,437,030 teaches the preparation of a thermoplastic elastomer composition prepared with a thermoplastic crystalline resin and a rubber, wherein the dynamic vulcanization of the rubber was carried-out using a phenolic resin in the presence of a catalyst formed by a metal halide and a metal carboxylate.

There is a growing demand for a wide variety of articles that are soft and soothing to touch. It is, of course, also important for these articles to have the strength, durability, and rigidity needed in the applications where the articles are used. This can be accomplished by overmolding a soft thermoplastic composition onto on a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set. There is currently a need for a thermoplastic elastomer composition that has superior feel and comfort as characterized by a lower modulus and lower hardness. There is a need for a soft thermoplastic elastomer composition that is very soft and has a unique, comfortable feel that is not otherwise attainable when a hard thermoplastic resin is present in the composition. There is a need for a thermoplastic elastomer (TPE) composition with a Shore A hardness as low as about 5 that is non-tacky, has good balance of oil resistance and compression set properties, low compressive modulus, unique feel, and can be made essentially odor-free which is obtained by dynamically crosslinking a diene containing elastomer and in the absence of a hard thermoplastic resin. Furthermore, there is a commercial need for soft and durable compositions with a Shore A hardness in the range of 5–30 that are obtained by dynamic crosslinking of styrene-butadiene random copolymer or ethylene-propylene-diene rubber.

SUMMARY OF THE INVENTION

This invention relates to a thermoplastic elastomer that is free of thermoplastic resins which can be overmolded onto a hard substrate, such as a plastic or metal surface. The thermoplastic elastomer composition of this invention offers lower cost and lower hardness. It can also be made to be essentially odor-free, scratch resistant and can be colored as desired.

The present invention provides a low-cost, gentle to the touch material that can be overmolded onto a hard substrate that exhibits lower hardness, superior feel and comfort. It can also be utilized in molding shoe soles, seals, gaskets, wheels for furniture, carts, household appliances, and the like.

The thermoplastic elastomer composition of this invention can be beneficially used in making grips or handles for articles of manufacture including, but not limited to, toothbrushes, shaving razors, hairbrushes, hairdryers, curling irons, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes. The thermoplastic elastomer composition of this invention will typically have a Shore A hardness of less than about 50. The Shore A hardness of such thermoplastic elastomer compositions will more typically be within the range of 0 to about 35 and will preferably be within the range of 2 to 25.

The present invention more specifically discloses a thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

The subject invention further reveals an article of manufacture that is comprised of a soft thermoplastic elastomer composition overmolded onto a hard substrate, such as a metal or thermoplastic resin, wherein the soft thermoplastic elastomer composition is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

The subject invention further reveals a process for manufacturing an article of manufacture that comprises (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, and (C) an oil, to produce an un-crosslinked three component blend; (2) dynamically crosslinking the crosslinkable elastomer in the un-crosslinked three component blend during a thermo-mechanical mixing step; wherein the thermoplastic elastomer composition is void of thermoplastic resins; (3) pelletizing the soft thermoplastic elastomer composition as it is being discharged from the thermo-mechanical mixing step; and (4) overmolding the soft thermoplastic elastomer composition onto a hard substrate to produce the article of manufacture.

DETAILED DESCRIPTION OF THE INVENTION

Block copolymers consisting of at least two polymeric blocks (A) composed mainly of a vinyl aromatic compound and at least one polymeric rubbery block (B) composed mainly of hydrogenated compounds or units that are obtained by the hydrogenation of conjugated diene compound, are to be used in this invention. It is preferred that in the block copolymer, a minimum number of two blocks are present, one composed of a vinyl aromatic compound or units such as styrene that provides stiffness or reinforcement, and another that is composed mainly of hydrogenated compounds or units that are obtained by the substantial hydrogenation of the conjugated diene compound or units, and provides elasticity. It is highly preferred that the block copolymer is a triblock copolymer with two end blocks of a vinyl aromatic compound and a rubbery mid block of substantial number of hydrogenated compounds or units. Block copolymers with partially hydrogenated mid-blocks may also be used and may contain a combination of hydrogenated compounds or units and their pre-cursor diene compounds or units.

The block copolymers that may be used in this invention are selected from the group of styrene-ethylene,butylenes-styrene (SEBS), styrene-ethylene,propylene-styrene (SEPS), hydrogenated styrene-isoprene copolymer, styrene-ethylene propylene (SEP) block copolymer, styrene-ethylene,ethylene propylene-styrene (SEEPS) and hydrogenated styrene-butadiene copolymer. Hydrogenated products that are copolymers or homopolymers of isoprene and butadiene-containing monomer units may also be used. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein by reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. No. 3,686,364 and U.S. Pat. No. 3,865,776 give some examples of block copolymers that may be used in the practice of this invention and are incorporated herein by reference. It is highly preferred that the highly saturated elastomer to be SEBS having a bound styrene content that is within the range of 10 weight percent to about 60 weight percent.

It is possible to use the saturated block copolymers that are modified versions of SEBS. Such modified block copolymers additionally have a substantial number of styrene units that are randomly distributed in the rubber mid-blocks of ethylene and butylene. These modified saturated block copolymers are supplied under Kraton® 'A' series. Saturated block copolymers grades as mentioned in TPE 2003 RAPRA Conference Proceedings, Brussels, Belgium, Sep. 16–17, 2003, Paper 18, Page 157, and Paper 21, page 181 may also be used and are incorporated herein by reference.

Hydrogenated diblock elastomers of styrene and butadiene or styrene and isoprene can also be used as the block copolymers or saturated block copolymers even though triblock elastomers are highly preferred. The block copolymers as used in this invention will be substantially saturated or hydrogenated. It is preferred that at least 75 percent of the original double bonds of the isoprene and/or butadiene units that are present in the block copolymers prior to the hydrogenation have been saturated by the hydrogenation process, more preferably at least 90 percent and most preferably at least 95 percent of the original double bonds have been saturated. Block copolymers that are partially hydrogenated may also be used, even though highly hydrogenated or saturated block copolymers are highly preferred.

The block copolymers that are useful in this invention are generally described in Chapter 11, Thermoplastic Elastomers, $2^{nd}$ Edition, Hanser Publishers, 1996, which is incorporated herein by reference.

The block copolymer will preferably be of a high molecular weight, with the weight average molecular weight greater than 100,000 grams/mole, more preferably greater than 150,000 grams/mole, and most preferably that is greater than 300,000 grams/mole. The block copolymer will preferably be oil extended with about 10 to about 700 parts of oil of the said block copolymer. It is also possible to add the oil in part or full during the thermo-mechanical mixing and the dynamic vulcanization of the said crosslinkable elastomer. The oil will preferably be a paraffinic, napthenic or polybutene. The triblock copolymer may be obtained by the hydrogenation of the diene units or compounds that have a higher vinyl content of no less than 30% of the said diene units or compounds.

A styrene-isobutylene-styrene triblock copolymer may also be used. Such block copolymers are synthesized by carbocationic polymerization process, and are generally described in Chapter 13, Thermoplastic Elastomers, $2^{nd}$ Edition, 1996, which is incorporated herein by reference.

In this specification, the term vulcanization or crosslinking or curing can be used interchangeably and indicate that the molecules of a polymer are linked together or are linked with the molecules of another polymer.

In this specification, the term grafting or grafted is used when the molecules of a polymer are linked with the molecules of another polymer by virtue of reaction of the functional groups present on the molecules of one polymer with the functional groups present on the other polymer. The functional groups may be present on the main chain or as pendant or on the side chains. The functional groups may be present by virtue of a copolymerization or reactive grafting initiated by a free-radical initiator such as a peroxide.

In this specification, the term elastomer and rubber are used interchangeably. The term thermoplastic elastomer refers to a polymeric material that has elastomer like properties and has thermoplastic processability and recyclability.

For purposes herein, the term elastomer and rubber indicate that the polymeric material exhibits a combination of high elongation or extensibility, high retractability to its original shape or dimensions after removal of the stress or load, with little or no plastic deformation and possesses low modulus and requires a low load to stretch the material. The term thermoplastic resin means a material having thermoplastic processability and has a high modulus and stiffness. Thermoplastic resins do not exhibit a combination of high elongation or extensibility, and are not retractable to their original shape or dimensions particularly when stretched and released beyond their yield point. High loads are required to stretch thermoplastic resins. Rubber elasticity is defined in Chapter 3 of L. R. G. Treloar, Introduction to Polymer Science (Wyneham Publications (London) Ltd. 1974), the teachings of which are incorporated herein by reference.

The crosslinkable elastomer polymerized by solution polymerization techniques can be a diene elastomer that is made with polymerization in a solvent such as hexane or cyclohexane. Such elastomers are well known to those skilled in this art. U.S. Pat. No. 6,566,478, U.S. Pat. No. 6,313,216, U.S. Pat. No. 6,372,863, U.S. Pat. No. 6,293,325, U.S. Pat. No. 6,289,959, U.S. Pat. No. 6,140,434, U.S. Pat. No. 5,844,044, U.S. Pat. No. 5,679,751, U.S. Pat. No. 5,677,402, U.S. Pat. No. 5,448,003, U.S. Pat. No. 5,239,009 and U.S. Pat. No. 5,272,220 generally describe such elastomers and methods for their synthesis. The teachings of these United States patents are incorporated herein by reference with respect to their description of such elastomers and their synthesis. The copolymeric elastomers used will be substantially random. Solution elastomers such as synthetic-polyisoprene may also be used. The solution elastomers used may be styrene-butadiene random copolymer or styrene-isoprene random copolymer with about 10 to about 40% by weight of bound styrene content. The Mooney viscosity of the said solution elastomer may be in the range of about 15 to about 120 Mooney as measured per ML 1+4 at 100° C. The styrene butadiene rubber will preferably have a vinyl content which is within the range of about 10 to 80%.

The solution diene rubbers that are particularly more useful in this invention for use as crosslinkable elastomers are the modified or coupled elastomers such as copolymers of styrene and diene selected from butadiene and isoprene and the living polymer, before terminating the polymerization, modified with tin or silicon. Such modified elastomers may also be for example styrene/butadiene copolymers and styrene/isoprene/butadiene ter-polymers. Homopolymers of diene may also be employed, but it is more preferred to have the styrene be present as a co-monomer. Copolymers of Isoprene and butadiene may also be used.

The dynamically crosslinked crosslinkable elastomer may be comprised of monomer units that are derived from 1,3-butadiene and isoprene, and a vinyl aromatic monomer, wherein the monomer units are essentially distributed in a random manner.

An important characteristics of the coupled elastomer, particularly the tin-modified elastomers, is that a substantial portion, preferably at least 40%, and more generally in the range of about 60 to about 85% of the tin (Sn) bonds or silicon (Si) bonds are bonded to the diene units of the styrene/diene copolymer, which may be referred herein as tin-dienyl or silicon-dienyl bond, for example butadienyl bonds in case of butadiene terminating with the tin (or silicon).

A copolymer-coupled elastomer may be prepared by copolymerization of styrene with 1,3-butadiene and/or isoprene in an organic solution with an alkyl lithium catalyst. A co-catalyst or catalyst modifier may also be used. Such polymerization methods are well known to those skilled in this art. After formation of the copolymer elastomer, but while the catalyst is still active and, therefore, while the copolymer is still considered a living or live polymer that is capable of further polymerization, the polymerization can be terminated by reacting the live polymer with a tin or silicon compound such as tin tetrachloride. This taking into account that the valence of tin is four, typically the modified copolymer is considered coupled or capped, with an accompanying molecular weight or viscosity jump or increase, and the modified copolymer being in what is sometimes called as a star shaped, or star configured, coupled elastomer. Coupling compounds similar to tin tetrachloride with a lower or higher valence may also be used to obtain an architecture that is higher or lower in the average number of arms that are obtained from a tin tetrachloride that has a valence of four. A tin coupled copolymer elastomer can also be obtained via coupling with an organo tin compound such as for example alkyl tin chloride, dialkyl tin chloride, and trialkyl tin chloride, resulting in variations in the tin coupled polymer with the trialkyl tin chloride yielding simply a tin terminated copolymer.

A coupled styrene/isoprene/butadiene terpolymer may also be used in this invention. Some examples of preparation of such coupled elastomers are further given in the following journal articles: "Solution-Polymerized Rubbers with Superior Breakdown Properties" Journal of Applied Polymer Science Vol. 14, PP 1421–1432 (1970), "Tin Coupled SBRs: Relationship between Coupling Type and Properties," Paper No. 78, Presented at 148th Meeting of the Rubber Division, American Chemical Society, Cleveland, Ohio, Oct. 17–20, 1995, and "Newly Developed Solution SBRs for Low Rolling Resistance Tire." RCT 1990 Vol. 63 # 1, P 8–22, which are incorporated herein by reference.

Some examples of modified or coupled solution elastomers such as tin or silicon-coupled, with several variations are given in U.S. Pat. No. 6,090,880, U.S. Pat. No. 5,064,910, U.S. Pat. No. 4,553,578, U.S. Pat. No. 4,444,236, U.S. Pat. No. 5,362,794, U.S. Pat. No. 5,677,399, U.S. Pat. No. 5,786,441, U.S. Pat. No. 6,008,295, U.S. Pat. No. 6,252,007, and U.S. Pat. No. 6,228,908, which are incorporated herein by reference, as they may also be used in thermoplastic elastomers as disclosed in this invention.

The crosslinkable elastomer may also be at least one elastomer that is selected from the group consisting of polyurethane elastomer, chlorinated polyethylene (TYRIN®), polychloroprene elastomer (NEOPRENE®), chlorosulfonyl polyethylene elastomer (HYPALON®), ethylene butyl acrylate copolymer, ethylene ethyl acrylate copolymer, ethylene vinyl acetate copolymer, hydrogenated acrylonitrile-butadiene rubber, acrylonitrile-butadiene rubber (nitrile rubber), polysulfide rubber, and silicone rubber, and the elastomer may be crosslinked with a peroxide curing system.

The crosslinkable elastomer may also be at least one elastomer that is selected from the group consisting of ethylene-propylene-diene rubber (EPDM), ethylene-propylene rubber (EPR), butyl rubber, halobutyl rubber, halogenated rubbery copolymers of p-alkylstyrene and at least one isomonoolefin having 4 to 7 carbon atoms, nitrile rubber and its copolymers, styrene-acrylate-acrylonitrile rubber (Sunigum®), hydrogenated nitrile rubber, acrylate rubber and its copolymers, ethylene-acrylate-glycidyl methacrylate elastomer, partially hydrogenated styrene-butadiene rubber, polyamide elastomer, polyester elastomer, natural rubber, and a polyolefin copolymeric elastomer having at least two repeat units that are derived from the group consisting of ethylene, propylene, butene, hexene, and octene. The crosslinkable elastomer can be an EPDM rubber with either norbornene, hexadiene or dicyclopentadiene monomer units.

When the crosslinkable elastomer is a polyurethane elastomer, the elastomer may be comprised of either polyester or polyether segments. Such elastomers are commercially available from BASF Corporation or Bayer Corporation. Polyurethane thermoplastic elastomers that can be used in the practice of this invention are described in Chapter 2, Thermoplastic Elastomers, 2nd Edition, Hanser Publishers, 1996, the teachings of which are incorporated herein by reference. It may be necessary to compatibilize the relatively polar polyurethane elastomers with the non-polar block copolymers during the thermomechanical mixing step. A functionalized elastomer containing amine or anhydride functional groups may be used for the compatibilization.

The functionalized elastomer can be a block copolymer. For instance, SEBS with maleic anhydride (maleated) functional groups can be used.

When the crosslinkable elastomer is nitrile rubber or its hydrogenated version (hydrogenated nitrile rubber), the acrylonitrile content may vary from about 5 to about 60% by weight of the said elastomer and may be as high to allow the polymer to exhibit an elastomer like extensibility and retractability. The nitrile rubber may be substantially or partially hydrogenated. The diene units in the nitrile rubber may be hydrogenated from about 40% to about 98% by weight. Such hydrogenated elastomers are commercially available from Zeon Chemicals. It may be necessary to use a compatibilizer to compatibilize the polar nitrile or hydrogenated nitrile rubber with the relatively non-polar block copolymer. The compatibilizer may consist of a combination of polar and non-polar segments. It is preferred that the compatibilizer is elastomeric in nature so that it has high extensibility and retractibility. A polyamide-block-ether elastomer may be used to compatibilize the nitrile rubber or its hydrogenated derivative with the block copolymer.

The crosslinkable elastomer can be styrene-acrylate-acrylonitrile rubber, such as Sunigum® rubber that is available from Eliokem. The content of styrene and acrylonitrile monomers will be low so that the ter-polymer is elastomeric in nature and is essentially retractable after removal of the stress. If the content of styrene and acrylonitrile is too high, the ter-polymer may become resin like and may become non-elastomeric and rigid and may not be useful to obtain soft and elastomeric compositions.

The crosslinkable elastomer may be a functionalized elastomer that has functional groups that are grafted or copolymerized on the elastomer and the said functional groups are selected from the group consisting of epoxide, carboxylic acid or anhydride, glycidyl methacrylate, hydroxyl, and amine. The functionalized elastomer is particularly useful for compatibilizing the more polar elastomers with the relatively non-polar block copolymers. The hydroxyl and carboxylic acid end groups present on the polyamide elastomer or polyether block amide elastomer may be reacted with the glycidyl methacrylate functional groups on the ethylene-ethyl acrylate-glycidyl methacrylate ter-elastomer, thereby forming polyamide chains grafted to the ethylene-ethylacrylate-glycidyl methacrylate ter elastomer, and the said grafted elastomer is rendered more compatible with the non-polar block copolymer.

The crosslinkable elastomer may have a Mooney viscosity in the range of about 10 to about 150 ML 1+4@100° C. It is more preferred to have the viscosity of the crosslinkable elastomer in the range of about 25 to about 125 ML 1+4@100° C. It is most preferred to have the viscosity of the crosslinkable elastomer in the range of about 45 to about 100 ML 1+4@100° C.

The crosslinkable elastomer may be a silicone elastomer. The silicone elastomer will preferably be a functionalized elastomer with functional groups present. The functional groups present on the silicone elastomer may react with the functional group present on the block copolymer. The silicone elastomer functionalized with amine or hydroxyl groups may be compatibilized with the block copolymer by reactive grafting of the silicone elastomer with the block copolymer that contains an acid or anhydride functional groups. The silicone elastomer may be grafted with the block copolymer by using olefinic elastomers with functional groups.

A thermoplastic elastomer composition may further contain a block copolymer consisting of at least two polymeric blocks (A) composed mainly of a vinyl aromatic compound and at least one polymeric rubbery block (B) composed mainly of hydrogenated compounds or units that are obtained by the hydrogenation of conjugated diene compound, the said block copolymer is a non oil extended block copolymer, and has a molecular weight of no more than 100,000 grams/mole. The relatively low molecular weight of the block copolymer is useful in obtaining a good surface appearance of the thermoplastic elastomer composition, improving melt strength, extrudability, and injection moldability.

A thermoplastic elastomer composition may further contain a block copolymer consisting of at least two polymeric blocks (A) composed mainly of a vinyl aromatic compound and at least one polymeric rubbery block (B) composed mainly of hydrogenated compounds or units that are obtained by the hydrogenation of conjugated diene compound, the said block copolymer is functionalized with functionality such as maleic anhydride, carboxylic acid, epoxide, amines and hydroxyls. The functionalized block copolymer may be reactively grafted to the functionality that is present on the polar and functional dynamically crosslinked crosslinkable elastomer that is more polar than the unfunctionalized block copolymer. The maleic anhydride grafted SEBS block copolymer can be grafted to the polyether block amide elastomer, thereby forming the grafted chains that in turn compatibilize the polyether block amide elastomer with the unfunctionalized block copolymer. The crosslinkable elastomer may be a polyamide elastomer and will preferably have alternating blocks or segments. Examples of polyamide elastomers include polyesteramide, polyetheresteramide, polycarbonate-esteramide, and polyether-block-amide elastomers. Polyether block amide elastomers are highly preferred. The thermoplastic elastomers based on polyamides are generally described in Chapter 9, Thermoplastic Elastomers, $2^{nd}$ Edition, Hanser Publishers, 1996, which is incorporated herein by reference.

The crosslinkable elastomer may be a polyester elastomer such as a polyether ester elastomer. Such elastomers are described in Chapter 8, Thermoplastic Elastomers, $2^{nd}$ Edition, Hanser Publishers, 1996, which is incorporated herein by reference.

The dynamic vulcanization of the crosslinkable elastomer is carried out during thermo-mechanical mixing with the said block copolymer, and in the absence of a hard, non-rubbery and non-elastomeric thermoplastic resin such as polypropylene or its rubber modified versions, polyethylenes including linear low density and high density resins, polystyrene resin, reactor modified polypropylene resin, nylon 6 or nylon 6,6 resin, non-elastomeric copolyamide resins, polybutylene terpthalate resin (PBT), acrylonitrile-butadiene-styrene resins, poly phenylene ether, polyphenylene sulfide, poly oxymethylene, poly methylmethacrylate, and polycarbonate resin. The dynamic vulcanization of the crosslinkable elastomer may also carried out in the absence of thermoplastic resins that have been modified with elastomers. Such resins are often called impact modified resins.

The dynamically crosslinked elastomer is crosslinked or vulcanized with a crosslinking or vulcanization or cure system that is selected from the group consisting of peroxides, sulfur, phenolic, metal fatty acid salt, amino-silane/carboxylic acid anhydride, and hydrosilation (also often called as hydrosilylation) curing systems. The dynamically crosslinked elastomer may be partially or fully crosslinked.

The dynamically crosslinked elastomer may be an ethylene-acrylate-glycidyl methacrylate or ethylene-acrylate-maleic anhydride ter-polymer or ter-elastomer. The dynamically crosslinked elastomer may be an ethylene-acrylate elastomer or an ethylene-acrylate elastomer with halogen functionality. The elastomer with halogen functionality may be crosslinked with a metal fatty acid salt curing system. U.S. Pat. No. 6,020,431 teaches the dynamic crosslinking of such elastomers or rubbers with a metal fatty acid salt and is incorporated herein by reference for the use of rubber and the curing agents and their processes.

The dynamic vulcanization of the crosslinkable elastomer in the presence of the block copolymer and absence of a hard and non-elastomeric thermoplastic resin may also be carried out by either grafting the crosslinkable elastomer with a carboxylic acid anhydride or using a crosslinkable elastomer copolymerized with a carboxylic acid anhydride, and vulcanizing the said elastomer with an amino silane. U.S. Pat. No. 6,448,343 teaches the dynamic curing of elastomers with the amino silane curing agents and is incorporated herein by reference.

When the dynamically crosslinked elastomer is fully or partially cured in the thermoplastic elastomer compositions, curatives of the known art may be employed. The curing may be accomplished by dynamic vulcanization, wherein the rubber phase is generally crosslinked simultaneously as it is being mixed with the block copolymer.

The dynamic crosslinking of the acrylate rubber with carboxylic acid functionality may also be carried with a multifunctional oxazoline, oxazine, imidazoline, or combinations thereof. U.S. Pat. No. 6,329,463 teaches the dynamic vulcanization of such elastomers and is incorporated herein by reference.

The curatives or curing agents may be selected from sulfur based, peroxide based, and/or phenolic based cure systems.

U.S. Pat. No. 2,972,600, U.S. Pat. No. 3,093,613, U.S. Pat. No. 3,887,756, U.S. Pat. No. 3,287,440, U.S. Pat. No. 3,758,643, U.S. Pat. No. 4,311,628, U.S. Pat. No. 3,806,558, U.S. Pat. No. 5,051,478, U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. No. 4,250,273, U.S. Pat. No. 4,927,882, U.S. Pat. No. 4,311,628, and U.S. Pat. No. 5,248,729 teach the type of curing or crosslinking or vulcanization agents or systems and methods that can be utilized and the teaching of these references are incorporated herein by reference.

When sulfur based curing agents are employed for curing the diene containing solution elastomer, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used.

When peroxide based curing agents or systems are used, co-activators or coagents that are known to a rubber chemist of ordinary skill may be used in combination with the peroxides. The peroxide curing agents are free radical generators that may combine to form graft molecules or crosslinked molecules. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer," Vol. 74, No 3, July-August 2001, the teachings of which are incorporated herein by reference.

The crosslinkable elastomer such as a diene containing elastomer may be dynamically vulcanized with hydrosilation curing systems in presence of the block copolymer and in the absence of hard and non-elastomeric thermoplastic resins. U.S. Pat. No. 6,251,998, U.S. Pat. No. 6,169,145, U.S. Pat. No. 6,150,464, U.S. Pat. No. 6,147,160, U.S. Pat. No. 6,084,031, U.S. Pat. No. 5,672,660, U.S. Pat. No. 5,936,028, and U.S. Pat. No. 4,803,244 teach the methods and hydrosilation crosslinking systems for dynamic vulcanization of the diene containing elastomers in presence of a hard and non-rubbery thermoplastic resin, and are incorporated herein by reference. Such hydrosilation cure systems and processes may be useful for making thermoplastic elastomer compositions void of hard and non-elastomeric thermoplastic resins that are comprised of the block copolymer and the dynamically crosslinked elastomer for applications that require low odor.

When a diene containing elastomer is to be dynamically crosslinked by hydrosilation, where a combination of a hydrosilation agent and a hydrosilation catalyst are used, the hydrosilation agent must contain at least two Si—H (silicon hydride) groups per molecule to effect the crosslinking of the crosslinkable elastomer and contain 0.003 to 2.0 weight percent of hydrogen bonded to silicon, and may be present from 0.1 to 10 parts by weight of crosslinkable elastomer, and may be represented by one or more or a combination of trimethylsiloxy terminated methylhydrosiloxane-dimethylsiloxane copolymers, hydride terminated polydimethylsiloxanes, hydride terminated methylhydrosiloxane-dimethylsiloxane copolymers, trimethylsiloxy terminated polymethylhydrosiloxanes, poly(dimethylhydrogensiloxy) silanes, tetrakis(dimethylsiloxy)silane, methyl tris(dimethyl siloxy) silane, phenyl tris (dimethylsiloxy)silane, polymethylcyclotetrasiloxanes and silicon hydrides of methylsiloxanes or polymethyldi- and polymethylsiloxanes. The preferred hydrosilation catalyst is a platinum zero compound that may be complexed with divinyltetramethyldisiloxanes or polyvinylmethyldisiloxanes or cyclovinylmethylsiloxanes where additional divinylsiloxanes or divinylmethyldisiloxanes or polyvinylmethylcyclosiloxanes may be present, or the platinum zero may be supported on inert carriers such as fumed silica, precipitated silica, and carbon and may be present from 0.01 to 10 parts of metal complex by weight of the diene-containing crosslinkable elastomer, palladium and rhodium may be used as the hydrosilation catalyst if so desired. Catalysts as described in U.S. Pat. No. 3,159,601, U.S. Pat. No. 3,715,334, and U.S. Pat. No. 3,775,452 are also useful in this invention, and are incorporated herein by reference.

The thermoplastic elastomer containing a diene containing crosslinkable elastomer will preferably be crosslinked with a hydrosilation system wherein the hydrosilation catalyst is selected from the group consisting of a platinum, platinum zero compounds complexed with compounds selected from carbon monoxide, fumarates, maleates, phosphines, divinyltetramethyldisiloxanes, tetravinyldimethyldisiloxanes, palladium, chloroplatinic acid, platinum chloride complexes in alcohols, and rhodium, that is complexed with a member selected from polyvinyltetramethyldisiloxanes or cyclovinylmethylsiloxanes wherein additional divinylsiloxanes or polyvinylmethylcyclosiloxanes are present, wherein the catalyst or catalyst complexed compounds are incorporated on the block copolymer, crosslinkable elastomer, and/ or oil, and are preferably present from about 0.0015 to about 1 parts metal catalyst by weight of the crosslinkable elastomer. The hydrosilation agent will most preferably be tetrakis (dimethylhydrogensiloxy)silane or tetrakis(dimethylsiloxy)silane. The hydrosilation catalyst will most preferably be a platinum zero compound that is complexed with carbon monoxide and polyvinylmethylcyclicsiloxanes to give a platinum carbonyl complex in cyclic methylvinylsiloxanes.

The hydrosilation catalyst and the Si—H containing hydrosilation agent or silioxane polymer may be fed in the aqueous emulsion forms into the twin-screw extruders during the preparation of the thermoplastic elastomer composition, and the moisture is driven-off by using vacuum. Such aqueous systems are commercially available from Dow-Corning Corporation under the trade name Syl-Off®.

When a silicone elastomer is used as the crosslinkable elastomer, it may be crosslinked with a peroxide or hydrosilation curing system. Some examples of silicone elastomers and the hydrosilation and peroxide curing systems employed are given in U.S. Pat. No. 6,569,958, U.S. Pat. No. 6,569,955, U.S. Pat. No. 6,465,552, U.S. Pat. No. 6,417,293, U.S. Pat. No. 6,362,288, and U.S. Pat. No. 6,362,287 wherein the dynamic vulcanization of the silicone elastomers was carried out in the presence of a hard and non-elastomeric polyester or nylon resin, and the teachings of which are incorporated herein by reference.

When the crosslinkable elastomer is at least partially crosslinked, the degree of crosslinking may be measured by dissolution of the blend of the thermoplastic vulcanizate in a solvent for specified duration, and using certain calculations to compensate for the insoluble or non crosslinked portion and then calculate percent (%) gel or unextractable rubber. The percent gel would normally increase with increasing crosslinking level. These techniques are well defined and established and are known to the persons that are skilled in this art. The percent gel content in the thermoplastic elastomer composition may be anywhere in the range of about 5% to 100%. The thermoplastic elastomer composition will typically have a gel content that is within the range of 25% to 100%. For purposes of this invention, 100% gel content means that no extractable crosslinkable elastomer is present and the crosslinkable elastomer is totally crosslinked.

The thermomechanical mixing step consists of mixing the block copolymer, oil, and crosslinkable elastomer under shear and preferably under conditions of elevated temperatures. The mixing may be carried-out in a batch or continuous or a combination of the batch and continuous mixers. Batch mixers, such as Banbury mixers, in combination with a single screw-extruder may be used. Continuous mixers such as twin-screw extruders are highly preferred. Twin-screw extruders have modular mixing elements and have the flexibility of simultaneous mixing and dynamically vulcanizing of the crosslinkable elastomer. The dynamic vulcanization of the crosslinkable elastomer is preferably carried out in a twin-screw extruder that consists of several kneading blocks with staggered angles designed for creating mixing, oil distribution, curing agents dispersion, distribution, and crosslinking of the elastomer. During dynamic vulcanization an elastomer is crosslinked under conditions of heat and shear while being thermomechanically mixed.

When a peroxide crosslinking system is employed to crosslink the crosslinkable elastomer, certain molecules of the block copolymer can also be crosslinked. The crosslinking of the block copolymer will preferably be limited to a low level so that smooth surface appearance is achieved.

When the crosslinkable elastomer is a thermoplastic elastomer, the amount of crosslinkable elastomer may substantially exceed the amount of the block copolymer. When the crosslinkable elastomer has no significant thermoplasticity, the amount of the crosslinkable elastomer may not substantially exceed the amount of the block copolymer. The preferred thermoplastic elastomer composition will comprise of 100 parts of the block copolymer, from about 5 to about 400 parts of the crosslinkable elastomer, and from about 10 to about 700 parts of oil, and the crosslinkable elastomer is crosslinked. The more preferred thermoplastic elastomer will comprise of 100 parts of the block copolymer, from about 15 to about 200 parts of the crosslinkable elastomer, and from about 50 to about 500 parts of oil, and the crosslinkable elastomer is crosslinked. The most preferred thermoplastic elastomer will comprise of 100 parts of the block copolymer, from about 25 to about 120 parts of the crosslinkable elastomer, and from about 70 to about 400 parts of oil, and the crosslinkable elastomer is crosslinked.

The overmolding of the soft thermoplastic composition can be achieved by a two shot or multi-component injection molding process or co-injection molding process. Such processes are generally described in "Special Technologies for Injection Moulding of TPE", Peter Pokorny, Engel Maschinebau GmbH, TPE 2000, 6 & 7$^{th}$ Mar. 2000, Paper 17, Amsterdam, conference proceedings. The teachings of this reference are incorporated herein by reference. The soft-thermoplastic elastomer overmolded onto the hard thermoplastic resin substrates are also described in "New Horizons in Thermoplastic Elastomers," Stephen J. Duckworth, M. A. Hanna Engineered Materials Europe, TPE 2000, 6 & 7$^{th}$ Mar. 2000, Paper 5, Amsterdam, and the teachings thereof are also incorporated herein by reference.

The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes. The soft thermoplastic elastomer composition can also be processed by either an extrusion or an injection molding process and the formed soft sleeve can be slipped onto the solid thermoplastic or metal substrate.

When the crosslinkable elastomer is a polar elastomer such as nitrile rubber, hydrogenated nitrile rubber, styrene-acrylate-acrylonitrile rubber, polyurethane rubber, and polyamide-co-ether elastomer, the thermoplastic elastomer compositions obtained will have better adhesion when overmolded on the polar thermoplastic substrates such as nylon, polystyrene or styrene containing plastic resins, polyester, and the like.

The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl)phenol, p-phenylenediamines, butylated reaction products of p-cresol and Dicyclopentadiene (DCPD), polyphenolic antioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay® C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

The soft thermoplastic elastomer blend composition may also contain reinforcement or fillers selected from the group consisting of talc, clay, calcium carbonate, silica, carbon black, and wollastonite.

This invention is illustrated by the following examples that are merely for the purpose of illustration and are not to be regarded as limiting the scope of the invention or the manner in which it can be practiced. Unless specifically indicated otherwise, parts and percentages are given by weight.

In the first step, a masterbatch of SEBS, oil, and an antioxidant was prepared by mixing the ingredients in a Henchel batch mixer for about twenty minutes. The resulting flakes were subsequently mixed in a twin-screw extruder under conditions of heat and shear. The temperature zones in the extruder average from 150° C. to about 230° C. and RPMs exceeding 200 were used. The masterbatch was pelletized in an underwater pelletizer, and for the purpose of this specification the masterbatch is herein called as Masterbatch A. The composition of the Masterbatch A is given in Table 1.

The formulations presented in the following examples were prepared in a Coperion ZSK25, 25 mm co-rotating, twin-screw extruder with an L/D of 48 and 12 barrels. Operating conditions of 180° C. barrel temperature and 25 lbs/hour feed rate were used in all case. The extruder screw speed was varied depending on the material temperature and ease of processing. The block copolymer, crosslinkable elastomers, and functionalized elastomers were added in the main hopper of the extruder. The solution polymerized styrene butadiene random copolymer, Solflex 16SN42, was converted from the bale form into a feedable crumb or ground form and was partitioned with about 3% talc. Also, the hydrogenated nitrile rubber, whenever used, was converted from the bale form into a feedable crumb or ground rubber form and was partitioned with about 5% talc. Examples 1 through 3 and 13 through 15 were processed at a screw speed of 300 RPM. Examples 7, 9, 10, 12 and 27 were processed at a screw speed of 275 RPM. Examples 8 and 11 were processed at a screw speed of 125 RPM. Examples 4 through 6, 16 through 20, 21 through 26 and 28 through 33 were processed at a screw speed of 550 RPM. In all cases when either peroxide or phenolic crosslinking agents were used, the crosslinking agents were added at the fifth barrel of the extruder. Peroxide crosslinking agents were blended with talc and fed in the extruder. When the two component hydrosilation crosslinking cure system was used, it was added on to the talc partitioned SBR and was fed in the main hopper of the twin-screw extruder. Measurement of the physical properties was carried out in accordance with the following ASTM standard text methods: Durometer hardness D2240-00, tensile properties D412-98a test method A, compression set D395-01 method B, effects of liquids (weight gain) D471-98, and compression modulus D695.

TABLE 1

Soft TPE Composition in Parts With and Without Thermoplastic Resin at High SBR Content and High Crosslinker Concentration

| | No. | | |
|---|---|---|---|
| | 1 | 2+ | 3+ |
| Solflex 16SN42[a] | 33.33 | 34.78 | 34.78 |
| Masterbatch A[b] | 100 | 100 | 100 |
| Dowlex ® 2045[c] | — | 14.49 | — |
| Atofina 7823MZ[d] | — | — | 21.74 |
| Mistron ® Vapor R[e] | 8.79 | 9.18 | 9.18 |
| Trigonox ® 101-45B-pd[f] | 0.52 | 0.54 | 0.54 |
| Total | 142.64 | 158.99 | 166.24 |

+Controls with thermoplastic resins

[a] Solution polymerized random styrene butadiene elastomer with 16 weight % bound styrene and 42 weight % vinyl (1,2-butadiene), and coupled with Sn

[b] Masterbatch A is an oil extended masterbatch of styrene-ethylene, butylene-styrene block copolymer comprised of 70 parts of Kraton G ® 1654 (a high molecular weight SEBS block copolymer from Kraton Polymers), 15 parts of Kraton G ® 1652 (a low molecular weight SEBS block copolymer fromKraton Polymers, 15 parts of Kraton ® G 1650 (a SEBS block copolymer from Kraton Polymers with molecular weight higher than Kraton G 1652), 250 parts of Drakeol 100 HP (a parafinic clear oil from Penrico), and 0.1 parts of Irganox 1010 (an antioxidant from Ciba Specialty Chemicals)

[c] Linear low density polyethylene resin from Dow

[d] Random polypropylene copolymer resin from Atofina

[e] Talc from Luzenac, America

[f] 45% active 2,5-Dimethyl-2,5-di(tert-butylperoxy)hexane, a peroxide curing agent from Akzo Nobel Polymer Chemicals LLC

TABLE 2

Properties of Soft TPE Composition in Parts With and Without Thermoplastic Resin at High SBR Content and High Crosslinker Concentration

| | No | | |
|---|---|---|---|
| | 1 | 2+ | 3+ |
| Shore A Hardness | 18 | 41 | 47 |
| Tensile Strength (MPa) | 0.8 | 1.9 | 1.6 |
| % Compression Set B @ 50° C. | 43 | 32 | 45 |
| % Weight Gain IRM Oil 903 @ 50° C. | 67 | 34 | 36 |

+Control

Example 1 that was prepared by dynamic vulcanization of the SBR in presence of the oil extended SEBS has the low Shore A hardness of 18, has an excellent feel, and a good balance of compression set properties. Example 1 demonstrates that the dynamic vulcanization of the SBR is done in the absence of a thermoplastic resin and in the presence of an oil extended SEBS block copolymer.

In Table 3, very soft compositions were prepared and SBR and peroxide concentrations were lowered. Example 6 had a higher loading of talc.

TABLE 3

Very Soft TPE Composition in Parts With and Without Thermoplastic Resin and at Medium SBR and Medium Crosslinker Concentration

| | No. | | |
|---|---|---|---|
| | 4 | 5+ | 6 |
| Solflex 16SN42 | 25 | 25 | 25 |
| Masterbatch A | 100 | 100 | 100 |
| Dowlex ® 2045 | — | 15 | — |
| Mistron Vapor R | 6.59 | 6.59 | 26.59 |
| Trigonox 101-45B-pd | 0.1 | 0.1 | 0.1 |
| Total | 131.69 | 146.69 | 151.69 |

+Control

TABLE 4

Properties of Very Soft TPE Composition in Parts With and Without Thermoplastic Resin or Filler at Medium SBR and Medium Crosslinker Concentration

| | No | | | |
|---|---|---|---|---|
| | 4 | 5+ | 6 | Masterbatch A |
| Shore A Hardness | 11 | 33 | 13 | 4 |
| Tensile Strength (MPa) | 0.4 | 1.7 | 0.7 | 1.7 |
| Compressive Modulus (MPa) | 0.5 | 1.7 | 0.6 | 0.5 |
| % Compression Set B 22 h @ 50 °C. | 59 | 51 | 45 | 100 |
| % Weight Gain IRM Oil 903 @ 50° C. | 78 | 48 | 68 | 122 |

+Controls

Example 5 contains the polyolefin thermoplastic resin, block copolymer, and crosslinked SBR, and had higher hardness and compressive modulus values. Masterbatch A, as described in Table 1, contained a blend of block copolymers and oil, had low hardness and low compressive modulus values but higher weight gain in oil and high compression set values, indicative of lower performance. The composition made in Example 4 that contains block copolymer, oil, and crosslinked SBR has low compressive modulus, hardness, and a good feel to the touch, and additionally, Example 6 has good compression set properties. Lower hardness and compressive modulus values are characteristics of TPE compositions for use as overmolded grips that provide extra comfort. Weight gain in oil for the Examples 4 and 6 is lower (better) when compared with the oil extended Masterbatch A. This is highly desirable in the grip applications where the grip comes in contact with oils.

In Table 5, very soft TPE compositions were prepared at lower concentration of peroxide curing agent, and the SBR concentration was varied.

TABLE 5

Very Soft TPE Composition in Parts Varying SBR Content at Low Crosslinker Concentration

| | No. | | | |
|---|---|---|---|---|
| | 7 | 8 | 9 | 10 |
| Solflex 16SN42 | 7.5 | 15 | 25 | 15 |
| Masterbatch A | 100 | 100 | 100 | 100 |
| Mistron Vapor R ® | 6.05 | 6.28 | 6.59 | 6.28 |
| Trigonox ® 101-45B-pd | 0.0075 | 0.015 | 0.025 | 0.06 |
| Total | 113.56 | 121.30 | 131.62 | 121.34 |

TABLE 6

Properties of Very Soft TPE Composition in Parts Varying SBR Content at Low Crosslinker Concentration

| | No | | | |
|---|---|---|---|---|
| | 7 | 8 | 9 | 10 |
| Shore A Hardness | 7 | 8 | 10 | 9 |
| Tensile Strength (MPa) | 0.8 | 0.5 | 0.5 | 0.4 |
| Compressive Modulus (MPa) | 0.4 | 0.4 | 0.5 | 0.4 |
| % Compression Set B 22 h @ 50° C. | 52 | 58 | 53 | 50 |
| % Weight Gain IRM Oil 903 @ 50° C. | 73 | 80 | 69 | 79 |

Examples 7 through 10 had good feel, low hardness, lower modulus and good compression set properties.

TABLE 7

Very Soft TPE Composition in Parts Varying Crosslinker Concentration

| | No. | |
|---|---|---|
| | 11 | 12 |
| Solflex 16SN42 | 25 | 25 |
| Masterbatch A | 100 | 100 |
| Mistron Vapor R ® | 0.77 | 6.59 |
| Trigonox ® 101-45B-pd | — | 0.25 |
| Total | 125.77 | 131.84 |

TABLE 8

Properties of Very Soft TPE Composition in Parts Varying Crosslinker Concentration

| | No | |
|---|---|---|
| | 11 | 12 |
| Shore A Hardness | 5 | 11 |
| Tensile Strength (MPa) | 0.4 | 0.8 |
| Compressive Modulus (MPa) | — | 0.6 |
| % Compression Set B 22 h @ 50° C. | 100 | 41 |
| % Weight Gain IRM Oil 903 @ 50° C. | 124 | 79 |

The crosslinked SBR in Example 12 that was dynamically vulcanized in presence of the block copolymer contributes to a good balance of compression set and oil resistance, when compared to the example 11 where the SBR was not crosslinked.

In Table 9, Kraton® G 1652 was added to improve the melt strength, extrudability, and injection moldability.

TABLE 9

Soft TPE Composition in Parts with Addition of Kraton G1652 to Vary Properties and Flow Characteristics

| | No. | | |
|---|---|---|---|
| | 13 | 14 | 15 |
| Solflex 16SN42 | 25 | 25 | 35 |
| Masterbatch A | 75 | 50 | 75 |
| Kraton ® G1652[g] | 25 | 50 | 25 |
| Mistron ® Vapor R | 6.59 | 6.59 | 6.59 |
| Trigonox ® 101-45B-pd | 0.1 | 0.1 | 0.14 |
| Total | 131.69 | 131.69 | 132.04 |

[g] Kraton ® G1652 is a non-oil extended styrene-ethylene, butylene-styrene triblock copolymer of Kraton Polymers, of about 41,000 g/mole weight average molecular weight

TABLE 10

Properties of Soft TPE Composition in Parts with Addition of Kraton ® G1652 to Vary Properties and Flow Characteristics

| | No | | |
|---|---|---|---|
| | 13 | 14 | 15 |
| Shore A Hardness | 25 | 43 | 27 |
| Tensile Strength (MPa) | 1.4 | 2.5 | 1.5 |
| Compressive Modulus (MPa) | 1.3 | 3 | 1.4 |
| % Compression Set B 22 h @ 50° C. | 77 | 84 | 74 |
| % Weight Gain IRM Oil 903 @ 50° C. | 70 | 61 | 60 |

The compositions of Table 9 had higher melt strength, had smooth extrudate appearance when exiting the twin-screw extruder. The formed pellets were also easily fed in the hoppers of the injection molding machines. The concentration of Kraton® G1652 can be lowered to lower the hardness and obtain a low compression set composition with excellent surface appearance.

TABLE 11

Thermoplastic Resin Less TPE Composition Containing Polyamide and Polyester Elastomers and Block Copolymer of High Concentration

| | No. | | | | |
|---|---|---|---|---|---|
| | 16 | 17 | 18 | 19 | 20 |
| Lotader ® AX8900 [h] | 25 | 15 | 25 | 15 | — |
| Pebax ® 4033SN01 [i] | — | 15 | — | 15 | 15 |
| Masterbatch A | 50 | 50 | 50 | 50 | 50 |
| Kraton ® FG1901X [j] | — | — | — | — | 15 |
| Kraton ® G1651 [k] | 50 | 50 | 50 | 50 | 50 |
| Mistron ® Vapor R | — | — | 5.8 | 5.8 | 5.8 |
| Trigonox ® 101-45B-pd | — | — | 0.1 | 0.1 | 0.1 |
| Total | 125 | 130 | 130.9 | 135.9 | 135.9 |

[h] Lotader ® AX8900 is a ter-elastomer modifier of ethylene-methyl acrylate-glycidyl methacrylate, with about 25 weight % of methyl acrylate, and 8 weight % of glycidyl methacrylate, Shore A Hardness of 70, and elongation at break of 900%, and is supplied by Atofina Chemicals, Inc.
[i] Pebax ® 4033SN01 is a polyether block amide thermoplastic elastomer of Shore D 42, and elongation @ break of 450%, with end functional groups comprised of carboxylic acid and hydroxyls, and supplied by Atofina Chemicals, Inc.
[j] Kraton ® FG1901X is a styrene-ethylene,butylene-styrene triblock copolymer that is grafted with maleic anhydride functional groups

TABLE 11-continued

Thermoplastic Resin Less TPE Composition Containing Polyamide and Polyester Elastomers and Block Copolymer of High Concentration

| | No. | | | | |
|---|---|---|---|---|---|
| | 16 | 17 | 18 | 19 | 20 | k) Kraton ® G1651 is a non-oil extended styrene-ethylene,butylene-styrene triblock copolymer of weight average molecular weight of 151,000 g/mole.

In Examples 17 and 19, the polyamide elastomer is grafted with the ethylene-methyl acrylate-glycidyl methacrylate ter-elastomer during the thermomechanical mixing. In Example 19, the graft molecules are additionally crosslinked with the peroxide crosslinking agent. In Example 20, the polyamide elastomer is grafted with the maleic anhydride groups of the SEBS-grafted maleic anhydride functional elastomer during the thermo-mechanical mixing.

TABLE 12

Properties of Thermoplastic Resin Less TPE Composition Containing Polyamide and Polyester Elastomers

| | No | | | | |
|---|---|---|---|---|---|
| | 16 | 17 | 18 | 19 | 20 |
| Shore A Hardness | 41 | 49 | 42 | 48 | 48 |
| Tensile Strength (MPa) | 1.8 | 2.3 | 1.7 | 2.1 | 2.8 |
| Compressive Modulus (MPa) | 3.3 | 4.4 | 3.3 | 4.4 | 4.1 |
| % Compression Set B 22 h @ 50° C. | 65 | 61 | 61 | 57 | 66 |
| % Weight Gain IRM Oil 903 @ 50° C. | 107 | 83 | 108 | 84 | 78 |

The compositions of Table 11 had excellent surface finish, and the compositions 18 and 19 that contained dynamically vulcanized elastomers had lower compression set when compared with their analog examples 16 and 17.

In Table 13, soft compositions were prepared by dynamically vulcanizing either SBR or EPDM with a phenolic cure system in the presence of the block copolymer and oil, and in the absence of hard thermoplastic resins.

TABLE 13

Very Soft TPE Composition Comparing Crosslinked SBR or Crosslinked EPDM, and crosslinked with Phenolic Cure System

| | No. | | |
|---|---|---|---|
| | 22 | 23 | 24 |
| Solflex 16SN42 | 25 | 25 | — |
| Royalene ® IM-7100[l] | — | — | 25 |
| Masterbatch A | 100 | 60 | 100 |
| Kraton ® G1652 | — | 40 | — |
| Mistron ® Vapor R | 0.773 | 0.773 | — |
| Phenolic resin[m] | 2.22 | 2.22 | 2.22 |
| Zinc Oxide | 0.36 | 0.36 | 0.36 |
| Total | 128.353 | 128.353 | 127.58 |

+Control
l)Royalene ® IM-7100 is an ethylene-propylene diene elastomer from Crompton Corporation
m)Poly-dispersion WBC-559P Firm 50C of Rhein Chemie (65% SP 1055 Phenolic Curative of Schenectady Chemicals)

TABLE 14

Properties of Very Soft TPE Composition Comparing Crosslinked SBR or Crosslinked EPDM, and crosslinked with Phenolic Cure System

| | No | | |
|---|---|---|---|
| | 22 | 23 | 24 |
| Shore A Hardness | 11 | 23 | 20 |
| Tensile Strength (MPa) | 0.4 | 1.2 | 1 |
| Compressive Modulus (MPa) | 0.5 | 1.1 | 0.9 |
| % Compression Set B 22 h @ 50° C. | 50 | 67 | 54 |
| % Weight Gain IRM Oil 903 @ 50° C. | 75 | 95 | 91 |

TABLE 15

TPE Composition Containing Polyamide (higher amounts) and Polyester Elastomers and Block Copolymer With and Without Thermoplastic Resin

| | No. | | |
|---|---|---|---|
| | 24 | 25 | 26+ |
| Lotader ® AX8900 | 25 | 25 | 25 |
| Pebax ® 4033SN01 | 50 | 50 | 50 |
| Masterbatch A | 85 | 85 | 85 |
| Kraton ® G1651 | 15 | 15 | 15 |
| Dowlex ® 2045 | — | — | 15 |
| Mistron ® Vapor R | — | 4.37 | 4.37 |
| Vul-Cup ® 40KE[n] | — | 0.45 | 0.45 |
| Total | 175 | 179.82 | 194.82 |

+Control with thermoplastic resin
n)40% active Di(tert-butylperoxy)-diisopropylbenzene, a peroxide curing agent from GEO Specialty Chemicals, Inc.

TABLE 16

Properties of TPE Composition Containing Polyamide (higher amounts) and Polyester Elastomers and Block Copolymer With and Without Thermoplastic Resin

| | No | | |
|---|---|---|---|
| | 24 | 25 | 26+ |
| Shore A Hardness | 50 | 57 | 63 |
| Tensile Strength (MPa) | 1.96 | 2.4 | 2.8 |
| Compressive Modulus (MPa) | 5.1 | 5.7 | 7.8 |
| % Compression Set B 22 h @ 50° C. | 69 | 67 | 59 |
| % Weight Gain IRM Oil 903 @ 50° C. | 69 | 46 | 32 |

+Control with thermoplastic resin

Example 25 that contained a crosslinked elastomer has lower hardness and modulus than the control Example 26 that additionally contained a linear low-density polyethylene thermoplastic resin. Lower hardness and modulus values are desired for soft-grip applications.

In Example 27, the two component hydrosilation catalyst was predispersed onto the Solflex 16SN42 in the following manner. A one-gallon polyethylene container fitted with a slow speed agitator and slow nitrogen sweep was charged with 567.5 g of Solflex 16SN42 rubber crumb that was treated with talc for free flow. The slow agitation and nitrogen stream were started as 22.7 g (4.0 phr based on crosslinkable Solflex 16SN42 elastomer) of tetrakis(dimethylsiloxy)silane crosslinking agent was added dropwise over a 5-minute period and stirred for a period of 15 minutes total to give good dispersion of the silicon hydride on the small rubber particles. The stirring and nitrogen flow continued as 0.42 g (0.0022 phr or 22 ppm platinum metal based on crosslinkable elastomer) of a platinum carbonyl complex with 3–3.5% platinum concentration in vinyl-terminated polydimethylsiloxane crosslinking catalyst was added dropwise over a 1-minute period and stirred for a period of 15 minutes total under nitrogen to give good dispersion of the platinum complex on the silane-treated Solflex 16SN42 rubber crumb. The entire addition and mixing of the crosslinking agent and the crosslinking catalyst with the Solflex 16SN42 crumb rubber was maintained at room temperature. This Productive Masterbatch was sealed under nitrogen in a polyethylene container prior to extrusion.

TABLE 17

Very Soft SBR Containing TPE Composition in Prepared with a Two Component Hydrosilation Crosslinking System

|  | No. 27 |
|---|---|
| Solflex 16SN42 | 18.25 |
| Masterbatch A | 100 |
| Mistron Vapor R ® | 0.57 |
| Silane crosslinking agent[o] | 0.73 |
| Platinum catalyst[p] | 0.014 |
| Total | 119.56 |

[o]tetrakis(dimethylsiloxy)silane crosslinking agent from Gelest Inc.
[p]platinum carbonyl complex with 3.0–3.5% platinum concentration in vinyl-terminated polydimethylsiloxane crosslinking catalyst from Gelest Inc.

TABLE 18

Properties of Very Soft TPE Composition in Prepared with Two Component Hydrosilation Crosslinking System

|  | No 27 |
|---|---|
| Shore A Hardness | 9 |
| Tensile Strength (MPa) | 0.6 |
| Compressive Modulus (MPa) | 0.5 |
| % Compression Set B 22 h @ 50° C. | 71 |
| % Weight Gain IRM Oil 903 @ 50° C. | 83 |

In Example 27, a very soft SBR-containing thermoplastic elastomer composition was prepared by dynamic vulcanization of the SBR with hydrosilation crosslinking system and in the absence of a thermoplastic resin. The prepared thermoplastic elastomer had a low Shore A hardness of 9. That is believed to be a softer SBR containing thermoplastic vulcanizate than any found in the prior art. The composition had a silky and non-oily dry feel that is hard to obtain in compositions that generally contain large amounts of oil. Further, the composition was essentially odor free, and had a good balance of compression set and oil resistance properties, when compared with Masterbatch A as previously mentioned.

TABLE 19

TPE Composition Containing Thermoplastic Polyurethane and Block Copolymer With and Without Thermoplastic Resin

|  | No. | |
|---|---|---|
|  | 28 | 29+ |
| Elastollan ® 1180A10[q] | 25 | 25 |
| Masterbatch A | 90 | 90 |
| Kraton ® FG1901X | 15 | 15 |
| Kraton ® G1651 | 10 | 10 |
| Dowlex ® 2045 | — | 10 |

TABLE 19-continued

TPE Composition Containing Thermoplastic Polyurethane and Block Copolymer With and Without Thermoplastic Resin

|  | No. | |
|---|---|---|
|  | 28 | 29+ |
| Mistron ® Vapor R | 3.75 | 3.75 |
| Vul-Cup ® 40KE | 0.1 | 0.1 |
| Total | 143.85 | 153.85 |

+Control with thermoplastic resin
[q]polyether based thermoplastic polyurethane elastomer of Shore A 80, 600% elongation at Break, from BASF Corporation Example 28 that contained a thermoplastic polyurethane elastomer had lower hardness and modulus when compared with Example 29 that additionally contained a linear low-density polyethylene thermoplastic resin.

TABLE 20

Properties of TPE Composition Containing Thermoplastic Polyurethane and Block Copolymer With and Without Thermoplastic Resin

|  | No | |
|---|---|---|
|  | 28 | 29+ |
| Shore A Hardness | 28 | 39 |
| Tensile Strength (MPa) | 2.2 | 3.2 |
| Compressive Modulus (MPa) | 1.5 | 2.4 |
| % Compression Set B 22 h @ 50° C. | 75 | 64 |
| % Weight Gain IRM Oil 903 @ 50° C. | 80 | 50 |

+Control with thermoplastic resin

Example 30 that contained a hydrogenated nitrile rubber had lower hardness and modulus values when compared with Example 31 that additionally contained a linear low-density polyethylene thermoplastic resin.

TABLE 21

TPE Composition Containing Hydrogenated Nitrile Rubber and Block Copolymer With and Without Thermoplastic Resin

|  | No. | |
|---|---|---|
|  | 30 | 31+ |
| Zetpol ® 2030L-05[r] | 25 | 25 |
| Masterbatch A | 90 | 90 |
| Pebax ® 4033SN01 | 15 | 15 |
| Kraton ® G1651 | 10 | 10 |
| Dowlex ® 2045 | — | 10 |
| Mistron ® Vapor R | 5.07 | 5.07 |
| Vul-Cup ® 40KE | 0.1 | 0.1 |
| Total | 145.17 | 155.17 |

+Control with thermoplastic resin
[r]Hydrogenated nitrile rubber from Zeon Chemicals L.P., with about 85% hydrogenation level, 36% acrylonitrile content, and Mooney Viscosity in the range of 50–65

TABLE 22

Properties of TPE Composition
Containing Hydrogenated Nitrile Rubber and Block Copolymer
of High Concentration With and Without Thermoplastic Resin

|  | No |  |
| --- | --- | --- |
|  | 30 | 31+ |
| Shore A Hardness | 28 | 40 |
| Tensile Strength (MPa) | 1.3 | 1.9 |
| Compressive Modulus (MPa) | 1.4 | 2.5 |
| % Compression Set B 22 h @ 50° C. | 71 | 58 |
| % Weight Gain IRM Oil 903 @ 50° C. | 69 | 35 |

+Control with thermoplastic resin

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, wherein the crosslinkable elastomer is comprised of repeat units that are derived from 1,3-butadiene, isoprene, and a vinyl aromatic monomer, wherein the repeat units in the crosslinkable elastomer are distributed in a random manner, and wherein the crosslinkable elastomer is coupled with a tin coupling agent or a silicon coupling agent, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins, wherein said thermoplastic resins are not retractable to their original shape after being stretched and released beyond their yield point.

2. A thermoplastic elastomer composition as specified in claim 1 wherein the oil is present at a level which is within the range of about 10 to about 700 parts by weight per 100 parts by weight of the block copolymer.

3. A thermoplastic elastomer composition as specified in claim 1 wherein at least about 90% of the double bonds in the repeat units in the second block are hydrogenated.

4. A thermoplastic elastomer composition as specified in claim 1 wherein the block copolymer is selected from the group consisting of styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, and styrene-isoprene-styrene block copolymers.

5. A thermoplastic elastomer composition as specified in claim 1 wherein the oil is an extender oil selected from the group consisting of paraffinic oils, naphthenic oils, and polybutene.

6. A thermoplastic elastomer composition as specified in claim 1 wherein the block copolymer is a styrene-ethylene, butylene-styrene triblock polymer, wherein the ethylene, butylene block is obtained by the hydrogenation of a butadiene mid block with a vinyl content of no less than 30 percent by weight.

7. A thermoplastic elastomer composition as specified in claim 1 wherein the block copolymer has a weight average molecular weight of at least 100,000.

8. A thermoplastic elastomer composition as specified in claim 1 wherein the crosslinkable elastomer is crosslinked with a phenolic curing system.

9. A thermoplastic elastomer composition as specified in claim 1 wherein the crosslinkable elastomer is crosslinked with sulfur.

10. A thermoplastic elastomer composition as specified in claim 1 wherein the crosslinkable elastomer is crosslinked with a peroxide curing system.

11. A thermoplastic elastomer composition as specified in claim 1 wherein the crosslinkable elastomer is crosslinked with a hydrosilation curing system.

12. A thermoplastic elastomer composition as specified in claim 1 wherein at least about 95% of the double bonds in the repeat units in the second block are hydrogenated.

13. A thermoplastic elastomer composition as specified in claim 1 wherein the crosslinkable elastomer is dynamically crosslinked with a metal fatty acid salt cure system.

14. A thermoplastic elastomer composition as specified in claim 11 wherein the hydrosilation cure system is comprised of a hydrosilation agent and a hydrosilation catalyst.

15. A thermoplastic elastomer composition as specified in claim 14 wherein the hydrosilation agent contains at least two silicon hydride (Si—H) groups per molecule and contains 0.003 to 2.0 weight percent of hydrogen bonded to silicon, and is selected from the group consisting of trimethylsiloxy terminated methylhydrosiloxane-dimethylsiloxane copolymers, hydride terminated polydimethylsiloxanes, hydride terminated methylhydrosiloxane-dimethylsiloxane copolymers, trimethylsiloxy terminated polymethylhydrosiloxanes, poly(dimethylhydrogensiloxy)silanes, tetrakis (dimethylsiloxy)silanes, tetrakis(dimethylsiloxy)silane, methyl tris (dimethyl siloxy) silane, phenyl tris (dimethylsiloxy)silane, polymethylcyclotetrasiloxanes and silicon hydrides of methylsiloxanes or polymethyldi- and polymethylsiloxanes.

16. A thermoplastic elastomer composition as specified in claim 14 wherein the hydrosilation catalyst is selected from the group consisting of a platinum, platinum zero compounds complexed with compounds selected from carbon monoxide, fumarates, maleates, phosphines, divinyltetramethyldisiloxanes or tetravinyltetramethylcyclesiloxanes, palladium, chloroplatinic acid, platinum chloride complexes in alcohols, and rhodium, that is complexed with a member selected from divinyltetramethyldisiloxanes or polyvinylmethyldisiloxanes or cyclovinylmethylsiloxanes wherein additional divinylsiloxanes or polyvinylsiloxanes or polyvinylmethylcyclosiloxanes are present, wherein the catalyst or catalyst complexed compounds are incorporated on the block copolymer, crosslinkable elastomer, and/or oil, and are preferably present from about 0.0015 to about 1 parts metal by weight of the crosslinkable elastomer.

17. A thermoplastic elastomer composition as specified in claim 14 wherein the hydrosilation catalyst is added by incorporating onto an inert carrier selected from the group consisting of fumed silica, precipitated silica, talc, calcium carbonate, paraffinic oil, and carbon black.

18. A thermoplastic elastomer composition as specified in claim 17 wherein the inert carrier is present at a level which is within the range of 0.01 to 10 parts by weight per 100 parts by weight of the crosslinkable elastomer.

19. A thermoplastic elastomer composition as specified in claim 17, wherein said thermoplastic elastomer composition is in the form of pellets, and wherein the soft thermoplastic elastomer composition is pelletized as it is being discharged from the thermo-mechanical mixing step.

20. A thermoplastic elastomer composition of claim 14 wherein the hydrosilation agent is tetrakis (dimethylhydrogensiloxy)silane.

21. A thermoplastic elastomer composition of claim 14 wherein the hydrosilation catalyst is a platinum zero compound that is complexed with carbon monoxide and polyvinylmethylcyclicsiloxanes to give a platinum carbonyl complex in cyclic methylvinylsiloxanes.

22. A thermoplastic elastomer composition as specified in claim 1 wherein the oil is present at a level which is within the range of about 50 to about 500 parts by weight per 100 parts by weight of the block copolymer.

23. A thermoplastic elastomer composition as specified in claim 1 wherein the oil is present at a level which is within the range of about 70 to about 400 parts by weight per 100 parts by weight of the block copolymer.

24. A thermoplastic elastomer composition as specified in claim 1 wherein the crosslinkable elastomer is present at a level which is within the range of about 5 to about 400 parts by weight per 100 parts by weight of the block copolymer.

25. A thermoplastic elastomer composition as specified in claim 1 wherein the crosslinkable elastomer is present at a level which is within the range of about 15 to about 200 parts by weight per 100 parts by weight of the block copolymer.

26. A thermoplastic elastomer composition as specified in claim 1 wherein the crosslinkable elastomer is present at a level which is within the range of about 25 to about 120 parts by weight per 100 parts by weight of the block copolymer.

27. A thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, wherein the crosslinkable elastomer is an acrylic copolymer, wherein the acrylic copolymer is functionalized with a halogen, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

28. A thermoplastic elastomer composition as specified in claim 27 wherein the oil is present at a level which is within the range of about 10 to about 700 parts by weight per 100 parts by weight of the block copolymer.

29. A thermoplastic elastomer composition as specified in claim 27 wherein at least about 90% of the double bonds in the repeat units in the second block are hydrogenated.

30. A thermoplastic elastomer composition as specified in claim 27 wherein the block copolymer is selected from the group consisting of styrene-ethylene, butylene-styrene block copolymers, styrene-ethylene, propylene-styrene block copolymers, styrene-ethylene, propylene block copolymers, styrene-ethylene, ethylene propylene-styrene block copolymers, partially hydrogenated products of styrene-isoprene, butadiene-styrene block copolymers, styrene-butadiene-styrene block copolymers, and styrene-isoprene-styrene block copolymers.

31. A thermoplastic elastomer composition as specified in claim 27 wherein the oil is an extender oil selected from the group consisting of paraffinic oils, naphthenic oils, and polybutene.

32. A thermoplastic elastomer composition as specified in claim 27 wherein the block copolymer is a styrene-ethylene, butylene-styrene triblock polymer, wherein the ethylene, butylene block is obtained by the hydrogenation of a butadiene mid block with a vinyl content of no less than 30 percent by weight.

33. A thermoplastic elastomer composition as specified in claim 27 wherein the block copolymer has a weight average molecular weight of at least 100,000.

34. A thermoplastic elastomer composition as specified in claim 27 wherein the oil is present at a level which is within the range of about 50 to about 500 parts by weight per 100 parts by weight of the block copolymer.

35. A thermoplastic elastomer composition as specified in claim 27 wherein the oil is present at a level which is within the range of about 70 to about 400 parts by weight per 100 parts by weight of the block copolymer.

36. A thermoplastic elastomer composition as specified in claim 27 wherein the crosslinkable elastomer is present at a level which is within the range of about 5 to about 400 parts by weight per 100 parts by weight of the block copolymer.

37. A thermoplastic elastomer composition as specified in claim 27 wherein the crosslinkable elastomer is present at a level which is within the range of about 15 to about 200 parts by weight per 100 parts by weight of the block copolymer.

38. A thermoplastic elastomer composition as specified in claim 27 wherein the crosslinkable elastomer is present at a level which is within the range of about 25 to about 120 parts by weight per 100 parts by weight of the block copolymer.

39. A thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, wherein the crosslinkable elastomer is a polyamide elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

40. A thermoplastic elastomer composition as specified in claim 39 wherein a black copolymer is grafted onto the polyamide elastomer, wherein the block copolymer is comprised of a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature.

41. A thermoplastic elastomer composition as specified in claim 39 wherein the oil is present at a level which is within the range of about 10 to about 700 parts by weight per 100 parts by weight of the block copolymer.

42. A thermoplastic elastomer composition as specified in claim 39 wherein at least about 90% of the double bonds in the repeat units in the second block are hydrogenated.

43. A thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, wherein the crosslinkable elastomer is a polyurethane elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

44. A thermoplastic elastomer composition as specified in claim 43 wherein a block copolymer is grafted onto the polyurethane elastomer, wherein the block copolymer is comprised of a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature.

45. A thermoplastic elastomer composition that is made by a process comprising: (1) mixing (A) a block copolymer comprising a first polymeric block that is comprised of repeat units that are derived from a vinyl aromatic monomer and a second block that is comprised of repeat units that are derived from a conjugated diolefin monomer, wherein the repeat units in the second block are hydrogenated, and wherein the repeat units in the second block are elastomeric in nature, (B) a crosslinkable elastomer, wherein the crosslinkable elastomer is hydrogenated nitrile rubber and is compatibilized with a polyamide elastomer, and (C) an oil, to produce an un-crosslinked three component blend; and (2) dynamically crosslinking the crosslinkable elastomer in the un-crosslinked three component blend during a thermo-mechanical mixing step; wherein the thermoplastic elastomer composition is void of thermoplastic resins.

* * * * *